(12) United States Patent
Rasmussen

(10) Patent No.: US 6,524,707 B1
(45) Date of Patent: Feb. 25, 2003

(54) CARBON-BONDED METAL STRUCTURES AND METHODS OF FABRICATION

(75) Inventor: Paul S. Rasmussen, Livermore, CA (US)

(73) Assignee: PowerStor Corporation, Dublin, CA (US)

( * ) Notice: Subject to any disclaimer, the term of this patent is extended or adjusted under 35 U.S.C. 154(b) by 0 days.

(21) Appl. No.: 09/611,040

(22) Filed: Jul. 6, 2000

Related U.S. Application Data
(60) Provisional application No. 60/143,189, filed on Jul. 9, 1999.

(51) Int. Cl.[7] ................................................. B33B 9/00
(52) U.S. Cl. ..................... 428/408; 428/446; 428/698; 428/699
(58) Field of Search ............................. 428/408, 446, 428/698, 699, 697; 204/280, 290.01, 291, 292, 293, 294

(56) References Cited

U.S. PATENT DOCUMENTS
4,640,744 A * 2/1987 Howe .......................... 204/1 R
5,900,127 A * 5/1999 Iida et al. .................... 204/290

OTHER PUBLICATIONS
"Metro 54, 54NS and Metro 54NS–1 Aluminum Powder", Metro, Inc., Technical Bulletin, Apr. 30, 1984, pp. 1–6.

\* cited by examiner

Primary Examiner—Deborah Jones
Assistant Examiner—Abraham Bahta
(74) Attorney, Agent, or Firm—Beyer Weaver & Thomas LLP.

(57) ABSTRACT

Provided is a technique in which a carbon structure is first coated with a tie layer as a intermediate prior to the deposition of metal on a carbon substrate. The tie layer is composed of a material with structural and chemical affinity for both carbon and metal. Capacitor electrodes formed according to this technique show very low Equivalent Series Resistance (ESR) and improved capacitance at high frequencies.

18 Claims, 4 Drawing Sheets

CARBON-BONDED METAL STRUCTURES AND METHODS OF FABRICATION

CROSS-REFERENCE TO RELATED APPLICATIONS

This application claims priority to U.S. Provisional Patent Application Ser. No. 60/143,189 entitled METHOD FOR ATTACHING CARBON STRUCTURES TO METAL, filed Jul. 9, 1999, the disclosure of which is incorporated by reference herein for all purposes.

BACKGROUND OF THE INVENTION

The present invention relates to the bonding of carbon structures to metal. In particular, the invention is related to methods of bonding of carbon structures to metal and composite structures formed according to this method which are particularly useful as capacitor electrodes, and may also be useful in a variety of other electrical, electronics, or structural applications.

Carbon is commonly used in a variety of forms as an electronic conductor in battery and capacitor electrodes. In order to extract current from the battery or capacitor it is necessary to attach a current collector, typically composed of a metal such as aluminum or copper, to the electrode. One method presently used to bond carbon to aluminum requires the carbon source, for example carbon black, carbon fibers, carbon aerogel, etc., to be ground into a fine powder. The powder is then mixed with an organic binder and a solvent carrier. This mixture in the form of a slurry is then coated on to the aluminum substrate that will serve as the current collector. A similar method is used to bond an electrode composed of compressed carbon to an aluminum current collector, except that the carbon is already in a powder form.

This method suffers from two main problems: coating adhesion and contact resistance. The organic binder serves two purposes, first it binds the coatings to the aluminum substrates, and second it binds the carbon particles (e.g., from aerogel or compressed carbon) together. The coating adhesion suffers when attempts are made to maximize the carbon contents in the electrode. For a given coating thickness, more carbon means that less binder may be used, and therefor less adhesion is obtained to the aluminum current collector substrate. The problem of contact resistance arises from the fact that the carbon particles can only make electrical contact at points where the particles is in mechanical contact with the aluminum substrate, and even then the particle must penetrate the oxide layer on the aluminum.

Many applications of capacitors require very low equivalent series resistance (ESR), for minimal insertion loss, high turn-around efficiency, and high frequency performance. Electrochemical double layer capacitors (EDLCs) have been prevented from being used in many traditional capacitor applications because a low-cost, mass produceable method for making a low resistance contact suitable for use in EDLCs has not been available.

One existing method for making a low resistance carbon contact is to place a sheet of commercially available carbon paper (e.g: from Lydol) on each side of a larger area sheet of inconel expanded metal (Exmet). This sandwich is then saturated with a precursor mixture of resorcinol-formaldehyde, used for making carbon aerogel. The saturated sandwich is then cured at about 90° C. and then pyrolyzed at 1050° C. to form an aerogel. This results in the active carbon aerogel being in intimate contact with the Exmet current collector, providing low resistance contact. The electrode assembly may then be spot-welded to the foil current collector.

While this method achieves a desired technical result, it has the drawback that both the materials and process arc expensive. Each electrode requires two sheets of carbon paper and one sheet of Exmet, plus the labor required to assemble the components. Moreover, the extra sheet of carbon paper, and the Exmet, result in excess thickness for most ESR applications.

Another approach which has been attempted to make good electrode contact between a carbon electrode and a metal current collector is flame or plasma spraying. These are well-known techniques for applying refractory metals and other coatings to metals and ceramics (see, for example, Technical Bulletin issued by METCO Inc. of Westbury, N.Y., issued in April 1984, the disclosure of which is incorporated by reference herein for all purposes). However, the use of flame or plasma spraying to apply metals to carbon structures for the purposes of forming low resistance contacts has met with unacceptable results. One possible explanation for these poor results is that the very different coefficient of thermal expansion of the carbon structures and the metal used to coat them result in poor adhesion of the carbon to the substrate and shearing at the carbon-metal interface on cooling.

Accordingly, a technique to produce a low resistance contact between a carbon structure and a metal would be useful in the development of improved capacitor and battery electrodes as well as in other electrical, electronic, and structural applications.

SUMMARY OF THE INVENTION

To achieve the foregoing, the present invention provides a technique in which a carbon structure is first coated with a tie layer as a intermediate prior to the deposition of metal on a carbon substrate. The tie layer is composed of a material with structural and chemical affinity for both carbon and metal. In a particularly preferred embodiment, the tie layer is formed by a high temperature deposition of silicon on the carbon structure, preferably by plasma deposition. A metal such as aluminum, nickel or copper, is then flame or plasma sprayed on to the carbide-coated carbon structure and alloys to the silicon and silicon carbide.

Thereafter, the silicon and metal sprayed carbon structure surface may be placed in contact with a metal substrate and heated to alloy the substrate to the previously spray-deposited silicon and metal material on the carbon structure surface. Capacitor electrodes formed according to this technique show very low Equivalent Series Resistance (ESR) and improved capacitance at high frequencies.

In one aspect, the invention provides an electrode having a metal-carbon laminate structure, including a carbon layer, a metal layer, and a tie layer between the carbon and metal layers. The tie layer is composed of a material with structural and chemical affinity for both carbon and the metal.

In another aspect, the invention provides a method of making an electrode. The method involves forming a tie layer on a carbon layer, the tie layer composed of a material with structural and chemical affinity for both the carbon and a metal, and bonding a metal layer to the tie layer-coated carbon layer.

In another aspect, the invention provides a metal-carbon laminate structure. The structure includes a carbon layer, a metal layer, and a tie layer between the carbon and metal layers, the tie layer composed of a material with structural and chemical affinity for both carbon and the metal.

In another aspect, the invention provides a method of bonding metal to carbon. The method involves providing a carbon substrate, forming a silicon carbide tie layer on a surface of the carbon substrate, and bonding a metal layer to the tie layer.

In yet another aspect, the invention provides a carbon fiber reinforced metal structure. The structure includes carbon fibers interspersed with metal, said carbon fibers coated with a silicon composition including silicon carbide.

In still another aspect, the invention provides a method of making carbon fiber reinforced metal structure. The method involves forming a silicon coating on carbon fibers and casting the coated carbon in a metal casting in which the temperature is high enough to form an alloy between the metal and the silicon, thereby forming an carbon/silicon metal matrix.

These and other features and advantages of the present invention are described below with reference to the drawings.

DETAILED DESCRIPTION OF PREFERRED EMBODIMENTS

Reference will now be made in detail to preferred embodiments of the invention. Examples of the preferred embodiments are illustrated in the accompanying drawings. While the invention will be described in conjunction with these preferred embodiments, it will be understood that it is not intended to limit the invention to such preferred embodiments. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

The present invention provides a method for bonding metal to carbon, and to structures, including capacitor electrodes, that may be formed thereby. Structures in accordance with the present invention include a tie layer between the carbon and metal components. The tie layer is composed of a material with structural and chemical affinity for both carbon and the metal to enhance the binding of those components.

Figure 1:
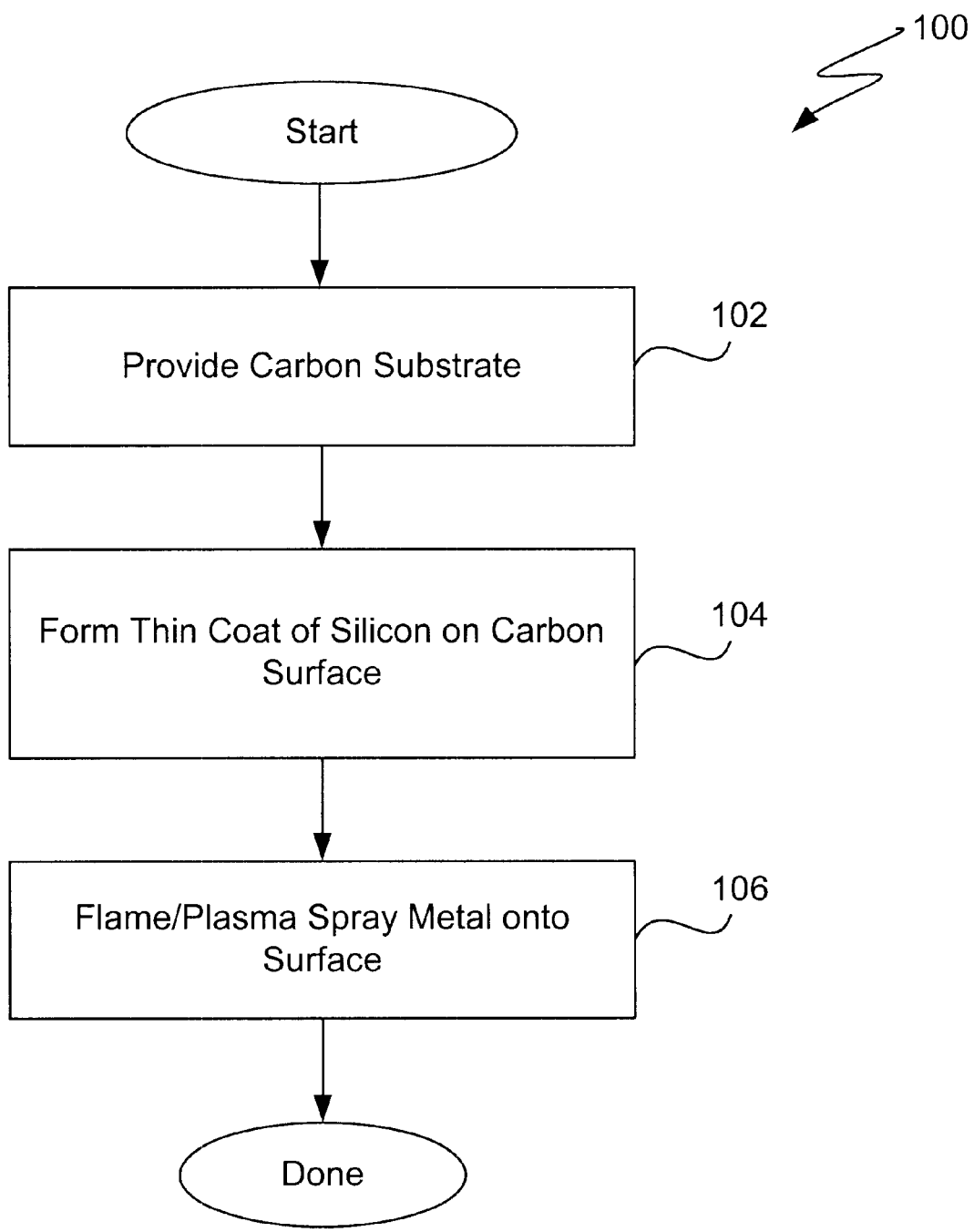
FIG. 1 is a flow charts depicting elements of a process in accordance with one embodiment of the present invention.

By contrast with previous approaches, the inventive method takes a different track for bonding carbon structures to metal. Referring to the flow chart 100 of FIG. 1, in a preferred embodiment, a carbon substrate (e.g., carbon aerogel) is not ground up into powder, but remains in its bulk form (102). A thin coat of silicon is formed on the carbon surface, for example, the surface may be plasma sprayed with a thin coat of silicon (104). The carbon/silicon surface is then plasma or flame sprayed with a metal, for example, aluminum (106). Thereafter, the resulting carbon/silicon/aluminum surface may be placed in contact with an aluminum substrate and the combination heated until the interface fuses. This method results in the formation of a bond between the carbon and metal that is very strong and very conductive, as further described in the Examples, below.

While not wishing to be bound by a particular theory, it is believed that the bond between the carbon and metal is improved because the thin layer of silicon forms an even thinner layer of silicon carbide (SiC) at the interface between the carbon and the silicon. The SiC chemically binds the silicon to the carbon at the interface. In bulk form, SiC is an insulator or a semiconductor, but as it is deposited by the plasma spray the Si/SiC layer is probably amorphous and not complete across the carbon/silicon boundary. When the metal is then sprayed on the silicon it is believed to form an Metal/Si alloy. Because of the amorphous and incomplete nature of the SiC layer, the metal will alloy with the silicon down to the carbon interface. Where the metal is aluminum, the Al/Si alloy is very conductive and with heat it can be attached to a variety of substrates. The Al/Si layer may be viewed as a "wetting" layer that will help fill gaps between the carbon and a metal substrate to which it is to be bound.

Suitable carbon structures for use in accordance with the present invention include, but are not limited to, carbon aerogel, carbon black, carbon electrodes, carbon fibers, carbon fabrics, carbon films, carbon filled plastics, and carbon nanotubes. Any of the above equivalent structures in graphite or diamond may also be used.

In the case of a preferred embodiment in which the carbon is a carbon aerogel, an additional advantage is that no organic binder is required, and thus there is no dilution of the carbon aerogel. Of course, as noted above, other forms of carbon may be used, such as compressed carbon, except that an organic binder may still be required to hold the carbon particles together.

Suitable metals include aluminum, copper, titanium, nickel or any other metal that will alloy with a silicon/carbide tie layer formed on a carbon surface. Aluminum, nickel and copper, which alloy easily with silicon, are particularly preferred in many applications. Depending on the application, one or a combination of the following metals may be used: aluminum, beryllium, chromium, copper, iron, hafnium, manganese, molybdenum, niobium, nickel, tantalum, thorium, uranium, tungsten, and zirconium.

As noted above, the metal that is used (e.g., for the wetting layer) should be a metal that alloys with the base tie layer. In one embodiment of the present invention, a carbon surface may be plasma sprayed with a thin layer of silicon. The thickness of the silicon should be in the range of about 0.0001 to 0.003, more preferably 0.0003 to 0.001 inches in thickness. The temperature at which the silicon particles strike the carbon surface should be in the range of about 1800 to 3000° C. In this way, a thin layer of silicon with an even thinner layer of silicon carbide at the carbon/silicon interface is produced. The silicon is now chemically bonded to the carbon.

Once the silicon layer has been applied to the carbon, a metal layer is deposited. In one preferred embodiment, the silicon/carbide surface is plasma or flame sprayed with an aluminum composition (e.g., pure aluminum or an aluminum alloy). An alloy having a composition of less than 13% silicon with the balance aluminum may be used in one embodiment. Other ratios and aluminum alloys may also be used, but keeping the mixture below about 13% silicon is preferred. In this embodiment, the alloy should contact the surface with a temperature of about 550° C. for oven or casting applications to in excess of 3000° C. for plasma depositions.

The plasma spray process, (also called arc spray), is a common commercial coating process whereby the material to be sprayed is injected into a high temperature plasma stream. Passing a carrier gas through a high temperature electrical arc creates the plasma. A typical carrier gas is argon with a few percent of hydrogen. As the material to be coated is injected into the plasma stream it melts and forms small molten droplets that are projected at the target surface by the plasma stream. The droplets fuse and solidify as they strike the target surface. The flame spray process is also a common commercial process that is very similar to the plasma spray process, except that typically a propane or oxygen-acetylene flame is used to heat the carrier gas. In this process the carrier gas is typically air or nitrogen gas mixed the combustion products. For either the plasma or the flame spray process there are several process variables that may be readily adjusted by one of skill in the art to optimize a given coating material for a given target material.

In a preferred embodiment, the alloy should be sprayed on with a thickness of about 0.0002 to 0.003 inch, more preferably about 0.001 inch and with a coverage of about 10 to 80% more preferably 40% to 60%, for example 50%. If the alloy coverage is too great or too thick the alloy layer may be stronger than the carbon and the alloy will pull apart the carbon as it cools. In the present invention, the alloy will further alloy with the silicon/carbide layer applied to the carbon. In some instances, this metal layer is a wetting layer which provides the material for further bonding to a metal substrate, as described further below.

In another embodiment, a metal used in the process may be deposited at a high enough temperature to allow a carbide to form from an underlying layer of silicon deposited on a carbon substrate. For example, a thin silicon layer may be formed on a carbon substrate by any suitable method, as are known to those skilled in the art, and aluminum may be flame sprayed on a carbon substrate having a thin silicon coating at a temperature high enough to form an alloy between the metal and the silicon/carbide; e.g., greater than about 600° C.). In this way, the SiC and aluminum/silicon alloys may be formed substantially simultaneously.

As noted above, following the bonding of the metal to the carbon substrate, the sprayed carbon/silicon/metal (e.g., aluminum) surface may be contacted with a substrate of the same or a compatible metal (e.g., again, aluminum) substrate and the components may then be heated in an inert, reducing atmosphere, or a vacuum furnace. The carbon and the substrate should be heated to at least about 800° C. This procedure will allow the previously-applied layers applied to alloy with the metal substrate.

In another embodiment, the carbon surface could be plasma coated with silicon as described above. Nickel, for example, may then be applied as the second layer, the wetting layer, again as described above. The carbon/silicon/nickel layer may then be placed in contact with a nickel substrate and the combination heated until the interface fuses.

Figure 2:
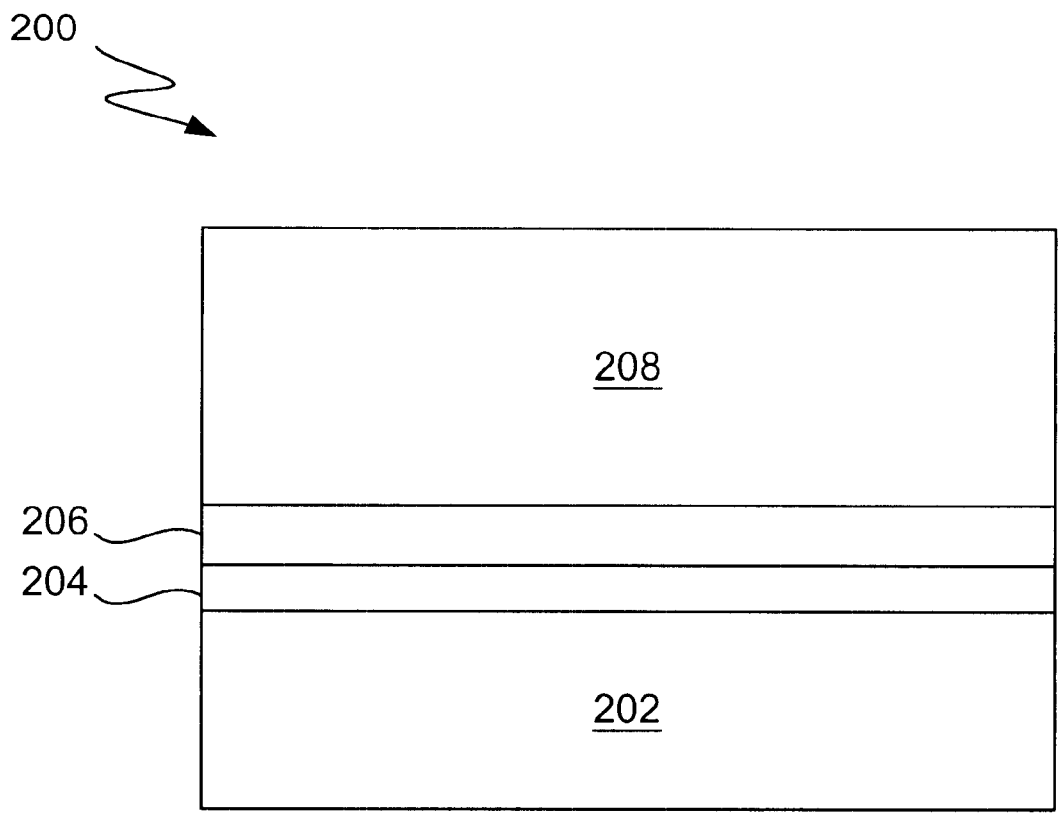
FIG. 2 depicts a structure in accordance with one embodiment of the present invention.

Referring to FIG. 2, a structure in accordance with one embodiment of the present invention is shown. The structure 200 includes a carbon substrate 202, a silicon/carbide layer 204, a metal wetting layer 206, and a metal substrate layer 208. The structure 200 may find useful application as a capacitor electrode, for example.

In a further embodiment, the wetting layer does not have to be applied by plasma or flame spray. The heat required to form the bond(s) between the layers may be provided in other ways. As an example, carbon can be sprayed with silicon, and then the carbon part could be cast into an aluminum casting (in which the temperature is high enough to form an alloy between the metal and the silicon/carbide; e.g., greater than about 600° C.). If in the last-described embodiment, silicon is sprayed onto carbon fibers, the fibers could then be cast into the aluminum to form an aluminum/carbon metal matrix.

The bond formed between the carbon and metal in accordance with the present invention is strong and provides a very low electrical and thermal contact resistance. The present invention may be applied to produce a low resistance contact between a carbon structure and a metal would be useful in the development of improved capacitor and battery electrodes as well as in other electrical, electronic, and structural applications.

EXAMPLE

The following example provides details concerning techniques and structures which demonstrate an implementation in accordance with the present invention, and data demonstrating the improved properties of capacitor electrodes formed in accordance with preferred embodiments of the invention. It should be understood the following is representative only, and that the invention is not limited by the detail set forth in this example.

Capacitors (EDLCs) were constructed according to conventional techniques and in accordance with the present invention and subjected to Equivalent Series Resistance (ESR) tests.

A conventional capacitor was constructed from powdered aerogel mixed with an a PVDF binder proportioned at 10% by weight relative to the carbon aerogel. The mixture of binder and carbon aerogel was coated to a thickness of 0.003 inch on 0.001 inch thick aluminum foil. Two pieces of coated foil were cut to provide a combined capacitor area of 2.10+/−0.05 $cm^2$. A microporus polypropylene separator was placed between the coated sides of the foil pieces. The assembly was then saturated with a propylene carbonate based electrolyte. After saturation the assembly was compressed between two rubber coated plates to hold the assembly together. This capacitor is represented by the ESR__powder and Cap__powder traces in FIGS. 3 and 4.

A second capacitor was constructed in a similar manner to that of the second capacitor, except that the 0.003 inch thick carbon aerogel disks were treated in accordance with the current invention. One side of each disk was plasma sprayed with a 0.0005 inch layer of silicon. The silicon layer was then flame sprayed with a 0.003 inch layer of copper. The copper was applied with a 50% coverage. The Si/Cu layer was then soldered to a 0.001 inch thick strip of copper foil for current collection. The assembly was saturated and compressed in the same manner as the first capacitor. This capacitor is represented by the ESR__mono_3 and Cap__mono_3 traces in FIGS. 3 and 4.

A third capacitor was constructed by taking two 0.003 inch thick carbon aerogel disks having a combined area of 2.20+/−0.05 $cm^2$ and placing a separator of the same type as used for the previously described capacitor between the disks. A piece of 0.001 inch thick copper foil was placed on the top and on the bottom of the stack to provide for current collection. The assembly was saturated and compressed in the same manner as the first capacitor. This capacitor is represented by the ESR_mono_4 and Cap_mono_4 traces in FIGS. 3 and 4.

The resulting EDLCs were measured for capacitance and ESR versus frequency. The results are plotted in FIGS. 3 and 4. The values shown in the plots of were normalized to a 1 cm² area.

Figure 3:
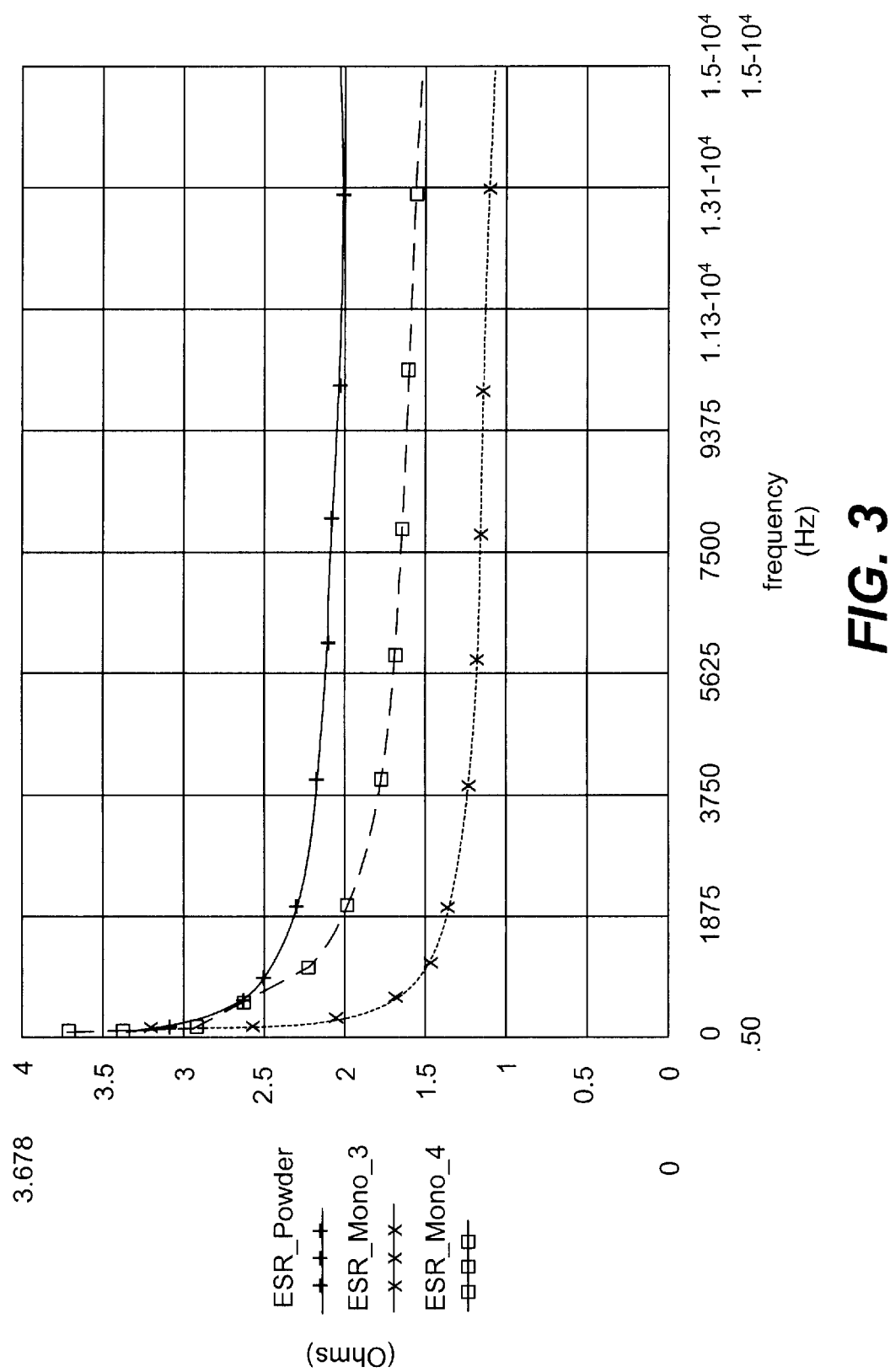
FIG. 3 is a graph depicting ESR vs. frequency data for various capacitors including some in accordance with embodiments of the present invention.

In FIG. 3 it can be seen that by employing this invention the ESR of an EDLC can be substantially reduced; in this example about halfed. It should be noted that about half of the gain appears to be obtained by switching the type of carbon aerogel from powdered to solid. The remainder of the ESR reduction is through reduction of the carbon to current collector contact resistance.

Figure 4:
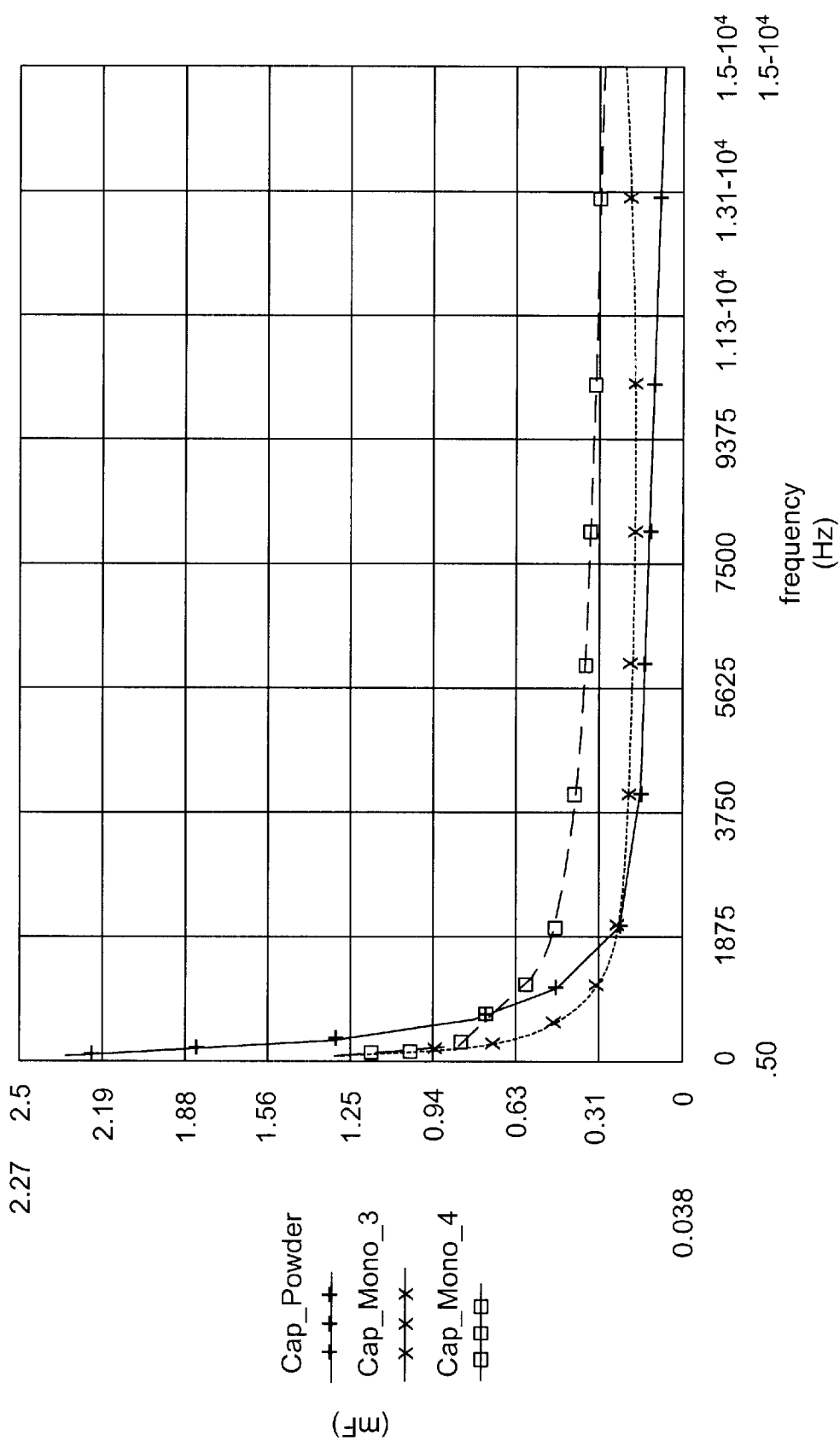
FIG. 4 is a graph depicting capacity vs. frequency data for various capacitors including some in accordance with embodiments of the present invention.

In FIG. 4 it can be seen that an EDLC constructed according to this invention (mono_3) shows increased capacitance. This is believed to be primarily due to the fact that solid aerogel is more dense than powdered aerogel.

Conclusion

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. An electrode, comprising:
    a metal-carbon laminate structure, comprising,
        a monolithic carbon aerogel substrate layer,
        a deposited metal layer, and,
        a deposited tie layer between said monolithic carbon aerogel and metal layers, said tie layer comprised of a material with structural and chemical affinity for both carbon and the metal.

2. The electrode of claim 1, wherein said monolithic carbon aerogel substrate layer is about 0.003 inch thick.

3. The electrode of claim 2, wherein said tie layer is about 0.0001 to 0.003 inched in thickness.

4. The electrode of claim 3, wherein said metal layer is about 0.0002 to 0.003 inches in thickness.

5. The electrode of claim 1, wherein said metal layer comprises a material selected from the group consisting of aluminum, beryllium, chromium, copper, iron, hafnium, manganese, molybdenum, niobium, nickel, tantalum, thorium, uranium, tungsten, and zirconium.

6. The electrode of claim 5, wherein said metal layer comprises at least one of aluminum, copper and nickel.

7. The electrode of claim 1, wherein said tie layer comprises silicon carbide.

8. The electrode of claim 7, wherein said silicon carbide is amorphous.

9. The electrode of claim 1, further comprising a metal substrate bonded to said metal layer.

10. The electrode of claim 9, wherein said electrode is incorporated in a capacitor.

11. The electrode of claim 1, wherein said deposited metal comprises aluminum.

12. The electrode of claim 11, wherein the metal is an aluminum-silicon alloy, wherein silicon is less than 13% by weight of the alloy.

13. The electrode of claim 11, wherein said deposited tie layer is silicon carbide.

14. The electrode of claim 1, wherein said deposited metal has a coverage of between about 10 and 80%.

15. The electrode of claim 1, wherein said deposited metal has a coverage of between about 40 and 60%.

16. The electrode of claim 1, wherein said deposited metal has a coverage of about 50%.

17. The electrode of claim 16, wherein said deposited metal is copper.

18. A metal-carbon laminate structure, comprising:
    a monolithic carbon aerogel substrate layer,
    a deposited metal layer, and,
    a deposited tie layer between said monolithic carbon aerogel and metal layers, said tie layer comprised of a material with structural and chemical affinity for both carbon and the metal.

* * * * *